US005997031A

United States Patent [19]

Heilig

[11] Patent Number: 5,997,031

[45] Date of Patent: Dec. 7, 1999

[54] COVER FOR A GAS BAG MODULE INTEGRATED IN AN VEHICLE STEERING WHEEL

[75] Inventor: Alexander Heilig, Wissgoldingen, Germany

[73] Assignee: TRW Occupant Restraint Systems GmbH, Alfdorf, Germany

[21] Appl. No.: 08/918,543

[22] Filed: Aug. 22, 1997

[30] Foreign Application Priority Data

Sep. 2, 1996 [DE] Germany ........................ 296 15 261 U

[51] Int. Cl.[6] ........................ B60R 21/20

[52] U.S. Cl. ........................ 280/728.3; 280/731; 74/558

[58] Field of Search ........................ 280/728.3, 731, 280/728.2, 750; 74/552, 558, 558.5

[56] References Cited

U.S. PATENT DOCUMENTS 2,106,989 2/1938 Truesdale .................................. 74/552
4,614,282 9/1986 Faul .
5,369,232 11/1994 Leonelli .
5,383,682 1/1995 Nagata et al. .
5,463,258 10/1995 Filion et al. ............................ 280/731
5,562,301 10/1996 Lutz ........................................ 280/731
5,568,936 10/1996 Spilker et al. ........................ 280/728.2
5,615,910 4/1997 Margetak et al. ................... 280/728.3
5,779,261 7/1998 Honda .................................. 280/728.3

*Primary Examiner*—Peter C. English
*Attorney, Agent, or Firm*—Tarolli, Sundheim, Covell, Tummino & Szabo LLP

[57] ABSTRACT

A cover is provided, which is adapted for being mounted to a vehicle steering wheel having spokes and a hub open at a side facing a vehicle occupant and provided with a gas bag module integrated therein. The cover is formed as a flexible hollow body enveloping the hub and comprising an upper wall, a lower wall and a side wall connecting the upper and the lower walls. The hollow body can be opened in the vicinity of the lower wall so that it may be fitted over the hub and engages behind the steering wheel by the lower wall in order to fix the hollow body to the steering wheel.

7 Claims, 2 Drawing Sheets

1
3
5
8
8
11
11
11
13
15
17
19
21
23
25
25
25

COVER FOR A GAS BAG MODULE INTEGRATED IN AN VEHICLE STEERING WHEEL

The invention relates to a cover for a gas bag module integrated in a hub part of a vehicle steering wheel. The invention further relates to a vehicle steering wheel provided with a cover of this type.

BACKGROUND OF THE INVENTION

Known covers arranged at a front face of a vehicle steering wheel having a gas bag module integrated in a hub part thereof, take the shape of a curved plate and are mounted on the front face of the hub part and screwed in place from behind. Furthermore, covers exist which feature latching lugs, capable of snapping into place in corresponding recesses in the steering wheel.

SUMMARY OF THE INVENTION

The invention provides a cover which permits simple mounting. Due to the cover according to the invention, the steering wheel itself may comprise at least in the region of the hub a minor foam sheathing, or indeed, none at all, thus facilitating access to the fastening points for securing the gas bag module and the steering wheel in place. In order to achieve this object, the invention provides a cover adapted for being mounted to a vehicle steering wheel having spokes and a hub open at a side facing a vehicle occupant and provided with a gas bag module integrated therein. The cover is formed as a flexible hollow body enveloping the hub and comprising an upper wall, a lower wall and a side wall connecting the upper and the lower walls. The hollow body is provided with means allowing to open the hollow body in the vicinity of the lower wall so that it may be fitted over the hub and engages behind the steering wheel by the lower wall in order to fix the hollow body to the steering wheel. The cover according to the invention forms at least one part of the padding of the hub body so that it merely needs to be foam-sheathed slightly or not at all. The thus lighter weight steering wheel provides better access for fitting to the steering shaft, which speeds up assembly as a whole.

In the case of a preferred embodiment, the cover comprises cuff-like protrusions which surround the steering wheel spokes at least over part of their length and which in the region of the lower wall may be opened along the steering wheel spokes for assembly. Accordingly, the steering wheel spoke needs to be foam-sheathed merely in part or even not at all. In the latter case the frame of the steering wheel is surrounded by the cover, and merely the steering wheel rim needs to be foam-sheathed. Since the majority of the surface of the steering wheel is surrounded by the cover according to the invention, the steering wheel may be configured always the same and have the same appearance, since its final appearance is dictated by the cover. Accordingly, merely the covers need to be surface-finished in different manners to equip a vehicle with a steering wheel of corresponding color and surface texture, as a result of which a modular constructional approach is achievable. Furthermore, steering wheels slightly differing in shape may also be provided with the same cover.

For arresting the cover to the steering wheel, the cover comprises means which may be brought into engagement with the steering wheel by fasteners. In addition to this, it is also possible, however, that the cuff-like protrusions to be opened in fitting the cover can be re-closed by fasteners engagable with each other at opposing closure rims of the lower wall, i.e. fasteners no longer need to be provided on the steering wheel itself, since the cover configured as a hub body is completely opened, clamped around the steering wheel and then re-closed.

On the outer surface of the upper wall offset and/or projecting regions are provided, which form flexible switch surfaces. By actuating these surfaces, electrical circuits of a film switch secured to the inner side of the cover or of an integrated, electrically conducting layer may be closed so that driver controls are integrated in the steering wheel. This film switch may incorporate, for example, a diaphragm film or a potentiometer film.

However, it is not a mandatory requirement that the film switch be secured to the cover. In the case of the steering wheel in accordance with the invention, provided with the cover in accordance with the invention, the film switch may also be secured to the front face of the gas bag module or simply inserted between the front face of the gas bag module and the cover. All of the switches can thus be integrated in the cover itself, this being the reason why the steering wheel body can be configured simpler without the cover.

BRIEF DESCRIPTION OF THE DRAWINGS

Further features and advantages of the invention are apparent from the following description and from the attached drawings to which reference is made, in which.

DETAILED DESCRIPTION OF THE INVENTION

Figure 1:
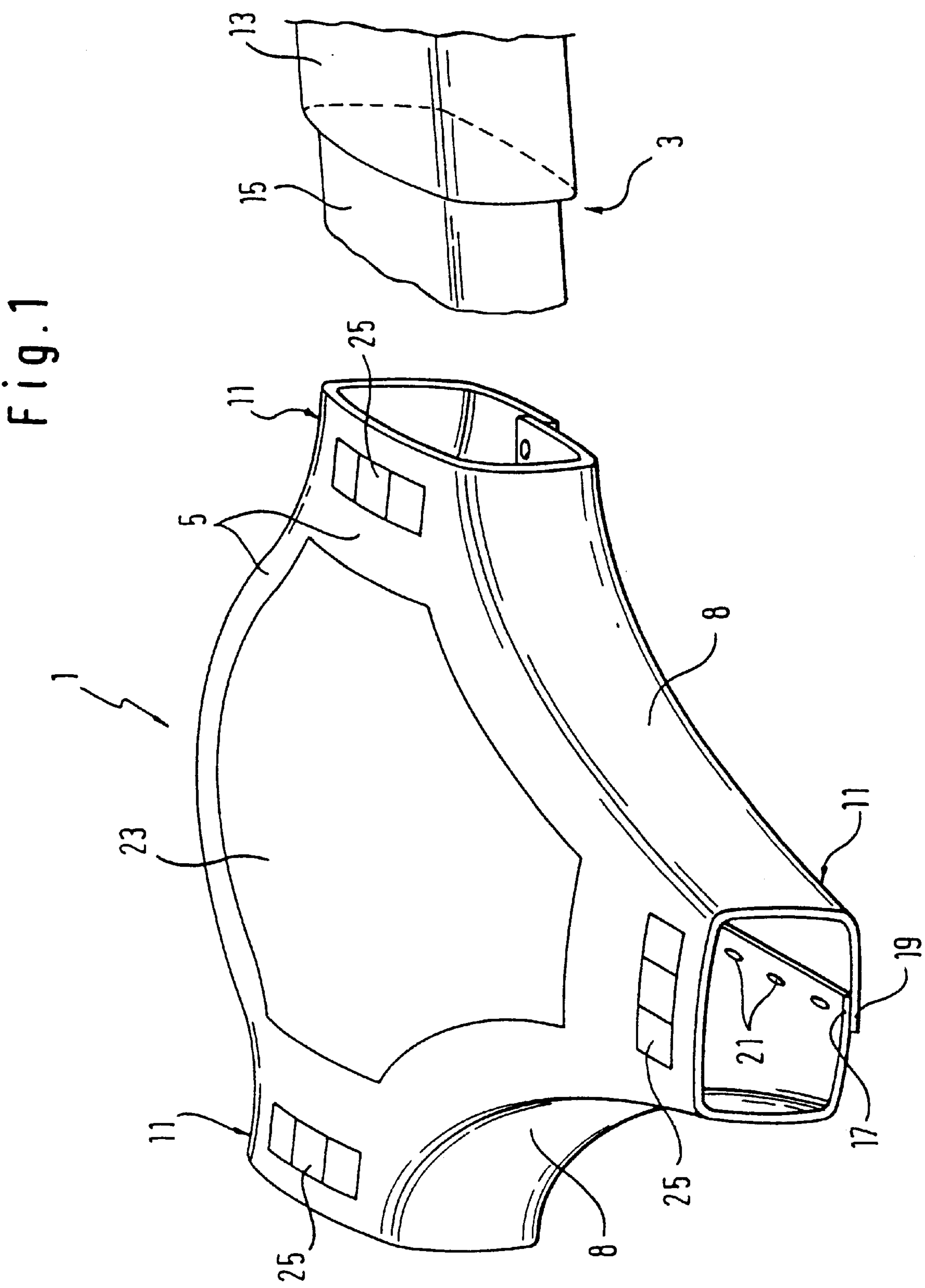
FIG. 1 is a perspective view from above of a cover in accordance with the invention as part of a vehicle steering wheel in accordance with the invention.
Figure 2:
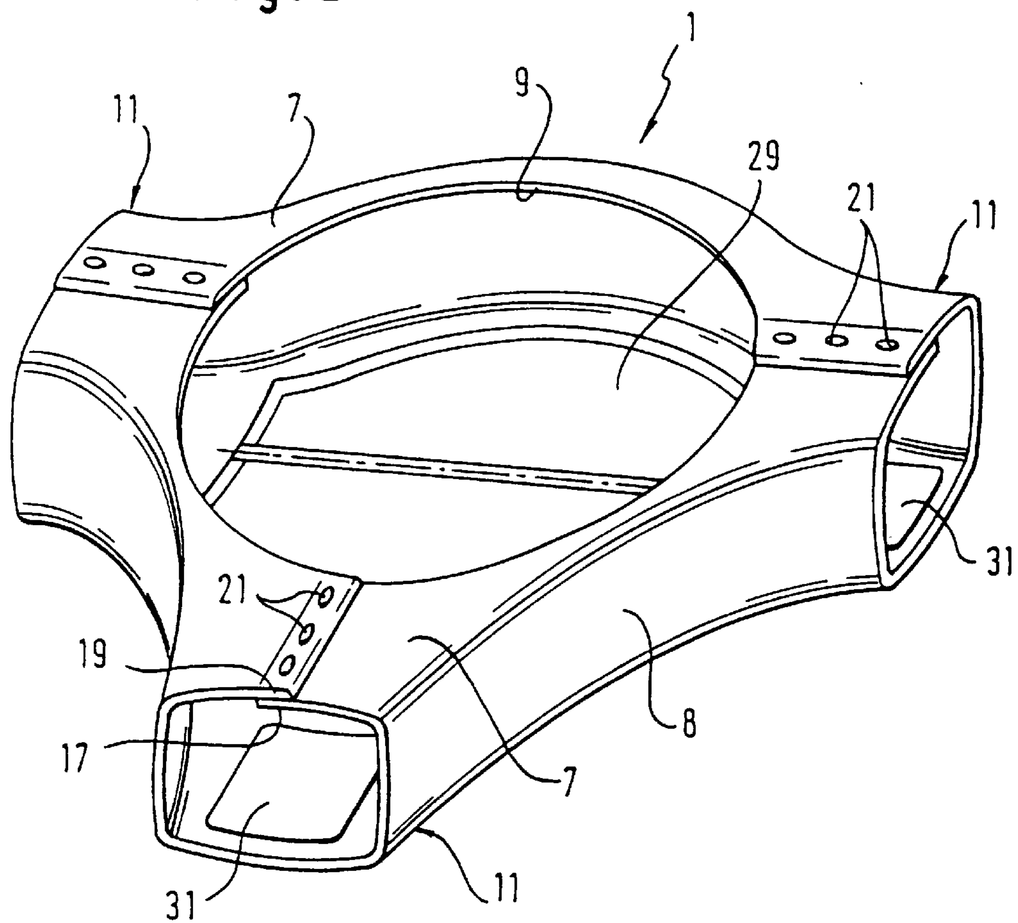
FIG. 2 is a perspective view from underneath of the cover shown in FIG. 1.

In FIG. 1 a cover 1 is shown for a vehicle steering wheel of which only part of one of its three steering wheel spokes 3 is represented. The cover 1 serves to cover the hub part of the steering wheel, into which a gas bag module (not shown) is inserted from the front, since the hub part in this region is a cavity. The cover 1 consists of a foamed or sheathed plastics material having a surface which as regards its texture and color matches the surface finish of the foam-sheathed steering wheel rim (not shown). The contour of the cover 1 is adapted to the outer contour of the steering wheel hub which is foam-sheathed only to slight degree. The cover 1 has the shape of a hollow body which in the region of its upper wall 5 is closed and in the region of its lower wall 7 is a cavity 9 (cf. FIG. 2) in the region of the steering shaft to which the steering wheel is secured. The upper wall and lower wall 5 and 7 respectively are connected to each other by side walls 8. When fitted to the steering wheel, the cover 1 surrounds not only the steering wheel hub on all sides but also part of the steering wheel spokes 3 since the cover 1 comprises cuff-like protrusions 11 for each steering wheel spoke 3. In the region of the protrusions 11, the steering wheel spokes 3 are not foam-sheathed, as is evident from FIG. 1, this being the reason why the foam-sheathing 13 of each steering wheel spoke 3 does not adjoin the protrusions 11 until these directly contact the frame 15 of the steering wheel spoke 3.

For its assembly, the cover 1 can be completely opened. For this purpose, the lower wall 7 is slit along each protrusion 11 parallel to the extension of the steering wheel spokes 3. The resulting opposed rims 17, 19 of each protrusion 11 overlap in the closed condition (cf. FIG. 2). At the inside rim 17, pins 21 are molded in place. These pins protrude outwardly, are provided with counterhooked ends and are engagable with corresponding openings in the outside rim 19. The resulting fastener is configured all-in-all as a clip connector.

On the upper wall 5, several switch surfaces are molded in the cover 1, namely a middle switch surface 23 for activating the horn and several switch surfaces 25 in the region of the protrusions 11, serving for example to activate the radio or other electrical means in the vehicle.

Figure 3A:
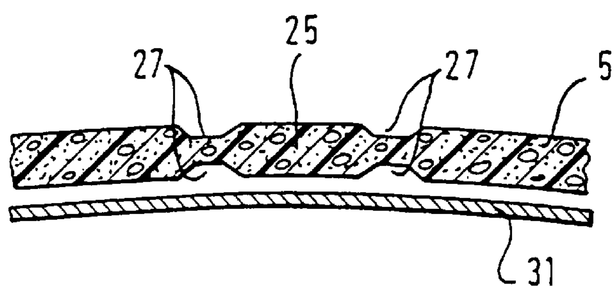
FIGS. 3*a* and 3*b* is a section views through the upper wall of the cover in the region of a switch surface which as shown in FIG. 3*a* is in the non-activated state and as shown in FIG. 3*b* is in the activated state.
Figure 3B:
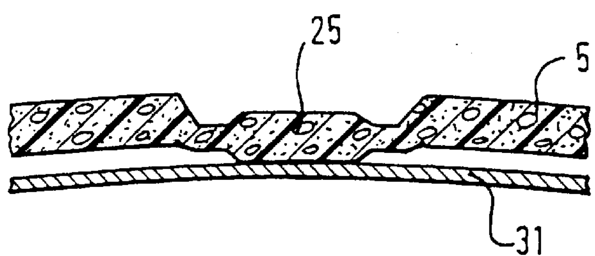

The switch surfaces 23, 25, as depicted in FIG. 3*a* by way of the switch surface 25, are formed by the upper wall 5 featuring on its inner and outer surface a recess 27 framing the switch surface 25 so that the thickness of the cover 1 in this region is reduced. As a result of this the switch surface 25 can be moved from the outside inwardly by finger pressure, as indicated in FIG. 3*b*. Due to the flexible material of the cover 1 and the recesses 27, each switch surface 23, 25 can be pressed inwardly, it subsequently springing back into its starting position. Pressing the switch surface 23 brings it into contact with a film switch 29 provided on the inner surface of the upper wall 5 for actuating the horn and by pressing the switch surfaces 25 the potentiometer films 31 also provided on the inner surface are actuated. Instead of the film switch 29 or potentiometer films 31 fleetingly attached to the inner surface, however, an electrically conducting layer integrated in the cover 1 may be provided so that a closed circuit materializes.

Fitting the cover 1 to the vehicle steering wheel is done as follows: the vehicle steering wheel together with a gas bag module already assembled is bolted to the steering shaft. The foam-sheathing of the steering wheel missing in part in the region of its hub part and in the portion of the steering wheel spokes 3 adjacent the hub, facilitates access to the fastener locations of the steering wheel. Then, depending on whether switches are to be integrated in the steering wheel or not, and depending on the interior color scheme of the vehicle, a corresponding cover 1 is fitted over the hub part and a portion of the steering wheel spokes 3. For this purpose, the lower wall 7 of the cover 1 is opened completely so that in the case of a steering wheel having three spokes, the three resulting flanges can be hinged outwardly. After the cover 1 has been placed over the steering wheel, it is locked in place by the clip-type fasteners 21. Since the protrusions 11 totally enclose the steering wheel spokes 3 and the lower wall 7 clasps the steering wheel in the region of the hub part, an interlocking connection between steering wheel and cover 1 materializes.

Inserts (not shown) foam-sheathed in the upper wall 5 ensure a defined bursting and opening of the upper wall 5 on deployment of the gas bag in a crash situation, the recess 27, framing the switch surface 23 serving as the defined burst line.

I claim:

1. A cover for a vehicle steering wheel, the steering wheel having a plurality of spokes and a hub open at a side facing a vehicle occupant for receiving a gas bag module therein, said cover comprising:

a flexible hollow body adapted to envelop the hub of the steering wheel, said flexible hollow body having an upper wall, a lower wall, and side walls connecting said upper and said lower walls;

said flexible hollow body including protrusions in the form of cuffs adapted to surround each of the plurality of spokes of the steering wheel and adapted to extend over at least a portion of the length of the spokes, said protrusions having means for allowing said protrusions to open in the vicinity of said lower wall so that said cover may be fitted over the hub and the spokes to attach said hollow body to the steering wheel.

2. The cover of claim 1 wherein said hollow body has opposing closure rims in a lower wall of said protrusions, one of said opposing closure rims having means for fastening to the other of said closure rims to close said protrusions after fitting said cover over the steering wheel hub.

3. The cover of claim 2 wherein said means for fastening comprises clip connectors.

4. The cover of claim 1 wherein said upper wall has at least one region forming a flexible switch surface.

5. The cover of claim 4 wherein said upper wall has an outer surface with at least one recess, said at least one recess surrounding said flexible switch surface and delimiting said flexible switch surface from the remainder of said outer surface.

6. The cover of claim 4 wherein said upper wall has an inner surface and a film switch at said inner surface in the vicinity of said switch surface.

7. The cover of claim 1 wherein said cover is formed of a foamed plastic material.

* * * * *